United States Patent
Kubo (10) Patent No.: US 6,757,421 B1
(45) Date of Patent: Jun. 29, 2004

(54) METHOD AND APPARATUS FOR DETECTING DEFECTS

(75) Inventor: Kazutoshi Kubo, Asaka (JP)

(73) Assignee: Cognex Corporation, Natick, MA (US)

( * ) Notice: Subject to any disclaimer, the term of this patent is extended or adjusted under 35 U.S.C. 154(b) by 645 days.

(21) Appl. No.: 09/669,886

(22) Filed: Sep. 27, 2000

(51) Int. Cl.[7] .............................. G06K 9/00; H04N 7/18
(52) U.S. Cl. ..................... 382/149; 382/141; 382/197; 438/16; 348/126
(58) Field of Search ................................. 382/141–152, 382/197; 438/16; 348/125–134; 356/394

(56) References Cited

U.S. PATENT DOCUMENTS

| | | | | |
|---|---|---|---|---|
| 3,909,602 A | * | 9/1975 | Micka | 716/4 |
| 5,150,423 A | * | 9/1992 | Hoki | 382/145 |
| 5,394,481 A | * | 2/1995 | Kumagai et al. | 382/141 |
| 5,404,163 A | * | 4/1995 | Kubo | 348/142 |
| 5,430,548 A | * | 7/1995 | Hiroi et al. | 356/394 |
| 5,471,407 A | * | 11/1995 | Akasaka et al. | 382/145 |
| 5,608,816 A | * | 3/1997 | Kawahara et al. | 382/149 |
| 5,694,481 A | * | 12/1997 | Lam et al. | 382/145 |
| 6,292,582 B1 | * | 9/2001 | Lin et al. | 382/149 |
| 6,363,167 B1 | * | 3/2002 | Miyano et al. | 382/145 |

* cited by examiner

Primary Examiner—Bhavesh M. Mehta
Assistant Examiner—Aaron Carter (57) ABSTRACT

A method and apparatus for determining defects in a circuit pattern. An image including a circuit pattern is acquired. An outline of the circuit pattern is extracted and a contour image is generated. A shape of a contour in the contour image is evaluated to determine whether a defect exists.

15 Claims, 9 Drawing Sheets

METHOD AND APPARATUS FOR DETECTING DEFECTS

RESERVATION OF COPYRIGHT

The disclosure of this patent document contains material, which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

Aspects of the invention relate to a machine vision method and an apparatus for the detection of defects.

2. Description of Background Information

Machine vision involves the extraction of vision-related information by obtaining information representing an image, and then processing that information. Machine vision techniques are used in applications including character recognition, industrial inspection of manufactured objects, robot guidance systems, radiology, remote sensing and detecting and others.

In industrial inspections, machine vision is used to sort out products that are blemished, marred or otherwise defective. Golden Template Comparison (GTC) is one type of industrial inspection method that uses image intensity information to detect flaws or defects in two-dimensional scenes of inspected objects. Generally, GTC involves the comparison of a run-time (i.e., test) image to a template image which comprises statistical information obtained from known good scenes, obtained during train-time. More specifically, pixel intensity values of the run-time image are subtracted from those of a template image, and the differences between the two images are observed to determine whether a flaw or defect is present within the inspected object. GTC thus comprises two main phases: training and inspection. During training, the template image is constructed by sampling a plurality of images, each of which represents a scene of an object absent defects. During inspection, the run-time image, which represents the scene of the object to be tested (the inspected object), is then compared to the template image.

Recently, there have been increasing demands for an improved method and apparatus for detecting breaks and short circuits in patterns on printed circuit boards and corresponding exposure film. The use of the GTC method requires a considerable amount of memory to register a number of images as templates since a vast region must be divided into numerous sub-regions at high magnification to detect small defects. A more flexible method of detecting short circuits or breaks in patterns on printed circuit boards and corresponding exposure film is needed.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings and wherein.

DETAILED DESCRIPTION

Figure 1:
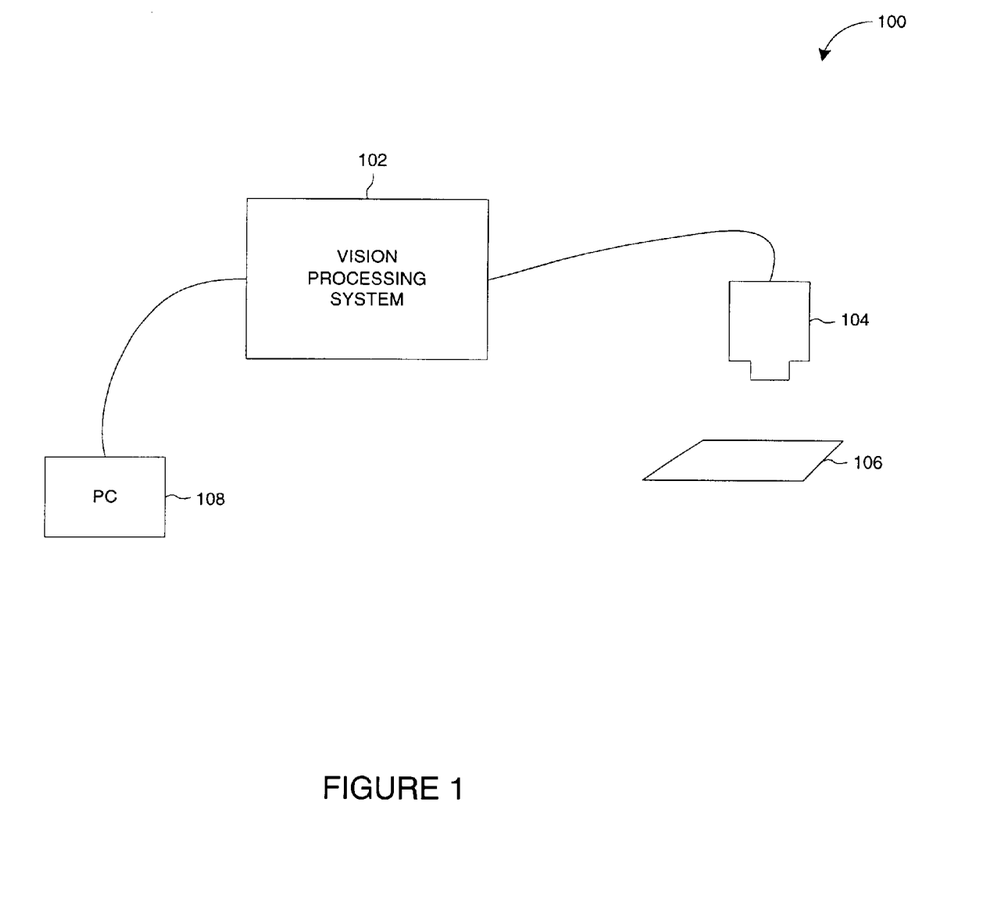
FIG. 1 illustrates a machine vision system.

FIG. 1 shows a first embodiment of the invention. A system 100 includes vision processing system 102 connected to a device by which a user may interface with the vision processor system 102, for example, a personal computer 108. A camera 104 for acquiring a digital image is connected to vision processor 102. The camera may be, for example, a digital camera or an analog camera, which provides an analog signal to an A/D converter. The camera 104 is positioned to acquire an image of an object, for example, a circuit board 106 or an exposure film.

Figure 2:
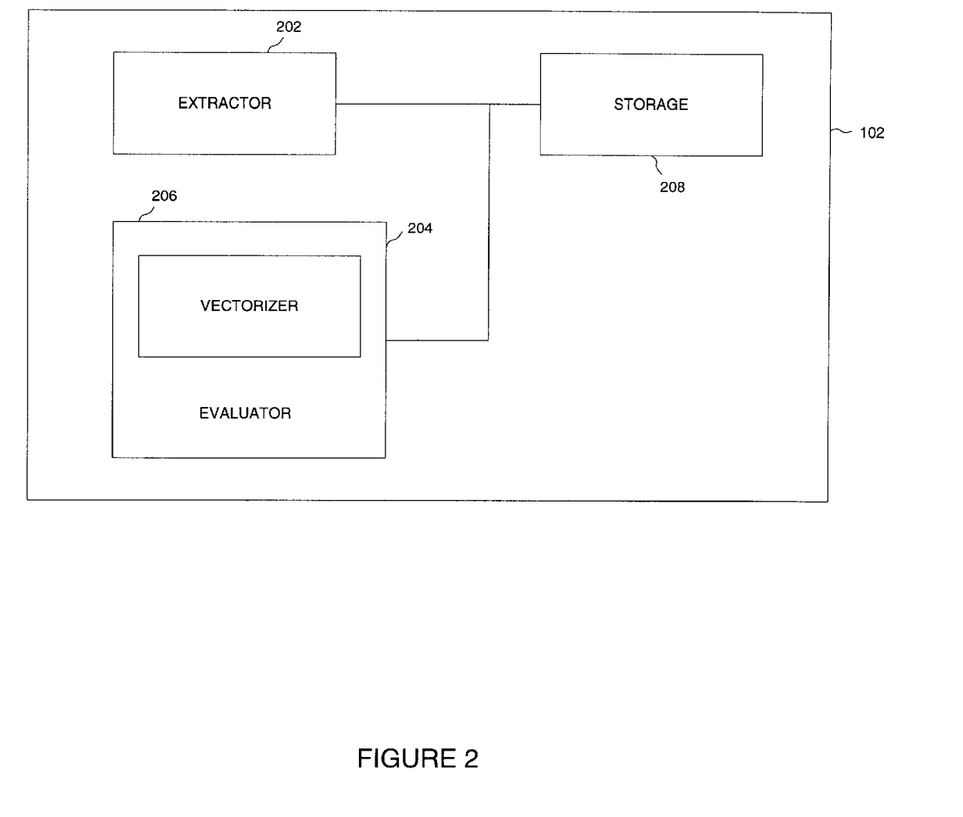
FIG. 2 is a functional view of the machine vision system of FIG. 1.

FIG. 2 shows a more detailed diagram of the vision processor 102 in an embodiment of the invention. Acquired images are stored in storage 208. Storage 208 may be, for example, computer memory or a storage media such as, for example, hard disk, optical storage or writable Compact Disk (CD R/W).

Figure 6:
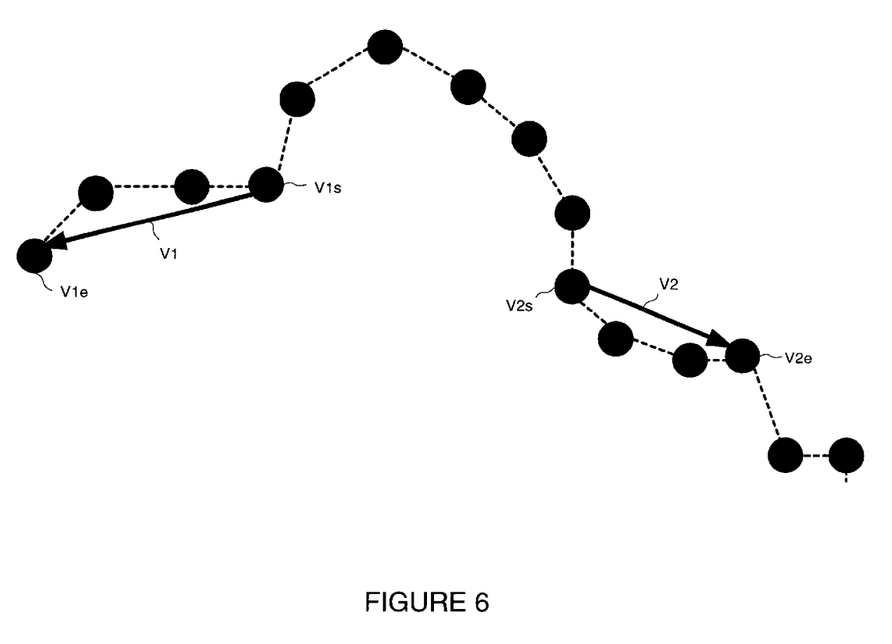
FIG. 6 illustrates a close-up view of the vectorization process shown in FIG. 5.

Extractor 202 analyzes the acquired image in storage 208 and generates a contour image, which may be stored in storage 208. The contour image is an image showing an outline or contour of a shape of an object in the acquired image. The contour includes a plurality of pixels which define the shape of the contour. The width of the contour in the acquired image is one pixel. FIG. 6 shows a portion of a contour image having a series of pixels defining the portion of the contour. Extractor 202 may be, for example, Edge Detection, produced by Cognex Corporation of Natick, Mass. for Cognex Corporation's PVE set of products.

Figure 3:
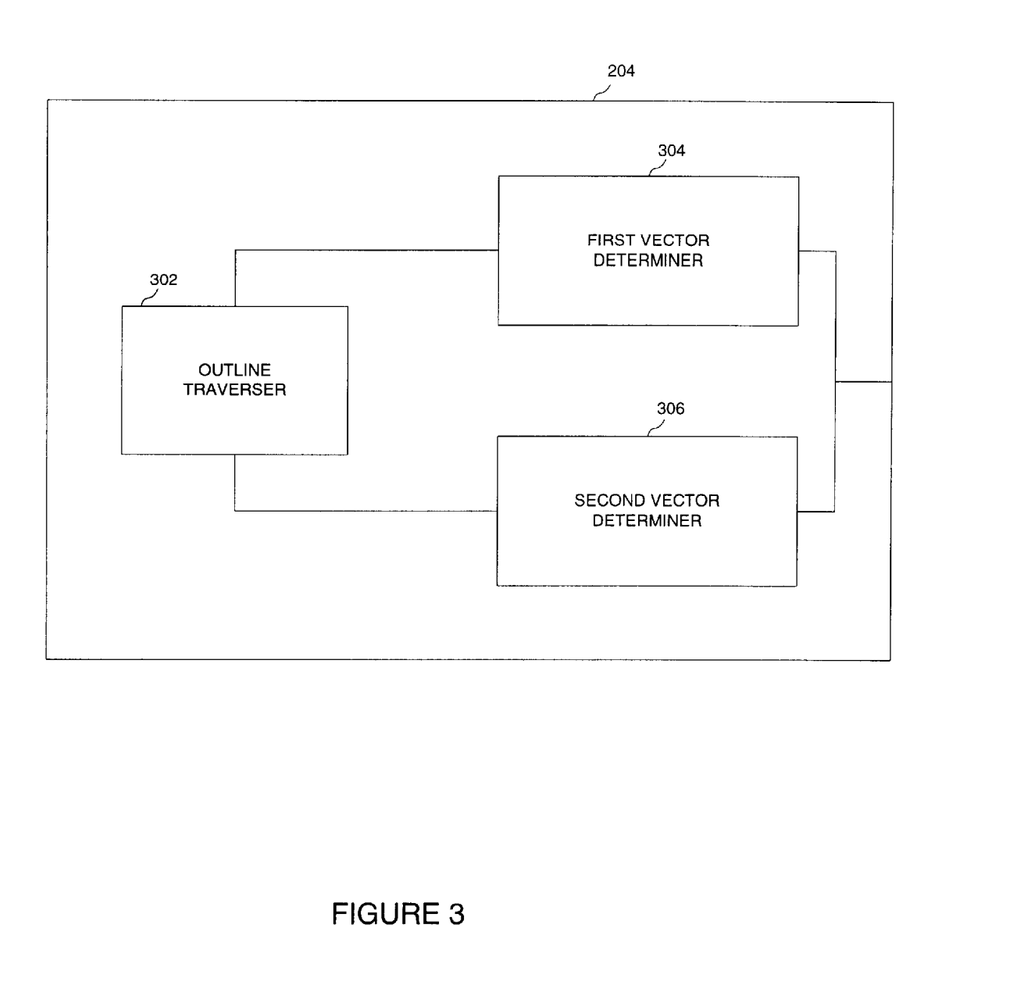
FIG. 3 is a functional view of a vectorizer shown in FIG. 2.

Vectorizer 204, included in evaluator 206, determines a first vector V1 and a second vector V2 based upon the pixels of the contour image. FIG. 3 illustrates the vectorizer 204 in more detail. The vectorizer 204 includes a first vector determiner 304 to determine a first V1, a second vector determiner 306 to determine a second vector V2, and an outline traverser 302 to move the vectors V1 and V2 along the contour.

Figure 4:
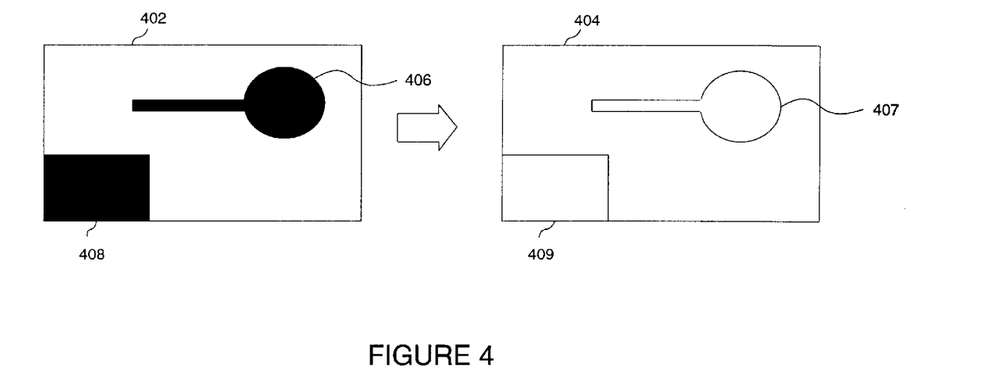
FIG. 4 shows an acquired image and a generated contour image.

Evaluator 206 evaluates V1 and V2 to determine whether a defect exists in a circuit pattern of the acquired image. FIG. 4 illustrates an example of an acquired image 402 and a corresponding contour image 404. A first object 406 in the acquired image is shown as contour 407 in the contour image 404. A second object 408 in the acquired image corresponds to contour 409 in contour image 404. Contour 407 is referred to as a closed pattern because the entire shape of the pattern is inside of the image, while contour 409 is referred to as a open pattern because the contour of the pattern is cut off by the edge of the image.

Figure 5:
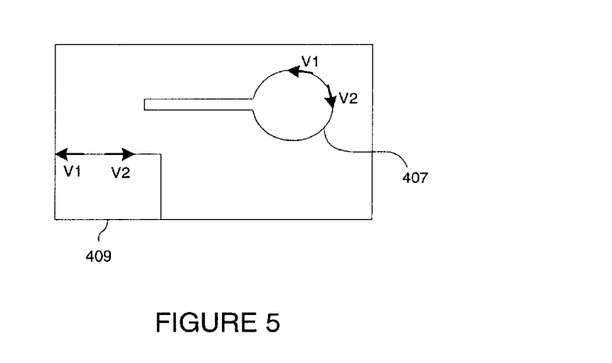
FIG. 5 illustrates vectorization of the contour images of FIG. 4.

FIGS. 5 and 6 are used to illustrate vectorization, which is performed by the vectorizer 204. In this embodiment of the invention, the vectorizer 204, when analyzing either closed pattern 407 or open pattern 409, first determines the size of V1 and V2 and a distance between V1 and V2. The size is a distance between pixels of the edge data which comprise the contour. The lengths of V1 and V2 depend upon a width of the detected pattern. For example, the width of the rectangle-like portion of contour 407 would be used as a length of vectors V1 and V2. A distance between V1s and V2s is set, for example, to be twice the width of the detected pattern. For contour 407 this would be twice the width of the rectangle-like portion. The first vector determiner 304 sets end point V1e and start point V1s according to the determined length of vector V1. The second vector determiner 306 sets end point V2e and start point V2s according to the determined length of vector V2 and a distance from V1s. V2s is set by the second vector determiner 306 to be a pixel located a distance from V1s which is twice the width of the detected pattern. An end point at which the evaluation terminates may be an end point at another edge of the acquired image, as determined by outline traverser 302.

In an open pattern, first set a start point V1e which may be a pixel at an edge of the acquired image, and set V1s according to the length of V1. Set V2s to be a pixel which is a distance from V1s which is twice the width of the detected pattern. V2e is a point or pixel located a length of V2 from V2s. An end point at which the evaluation terminates may be a pixel at another edge of the acquired image.

In a closed pattern, the start point V1e can be any point or pixel along the contour of the image. For example, the start point V1e may be the first found point of the image. After determining the start point V1e, V1s, and the length of V1, V2s and V2 are determined as described above for the open pattern. After evaluation is performed on V1 and V2, V1e, V1s, V2s, and V2e are shifted one pixel position and the shape of the contour is reevaluated. In a closed pattern, the V1e, V1s, V2s and V2e may be shifted one pixel in any direction. For an open pattern, outline traverser determines that an entire outline has been traversed when V2e has reached the end point. In a closed pattern, outline traverser 302 determines that the entire outline has been traversed when newly determined first and second vectors V1 and V2 would be equal to a previously analyzed V1 and V2, for example, the first generated V1 and V2 for the closed pattern.

Figure 7:
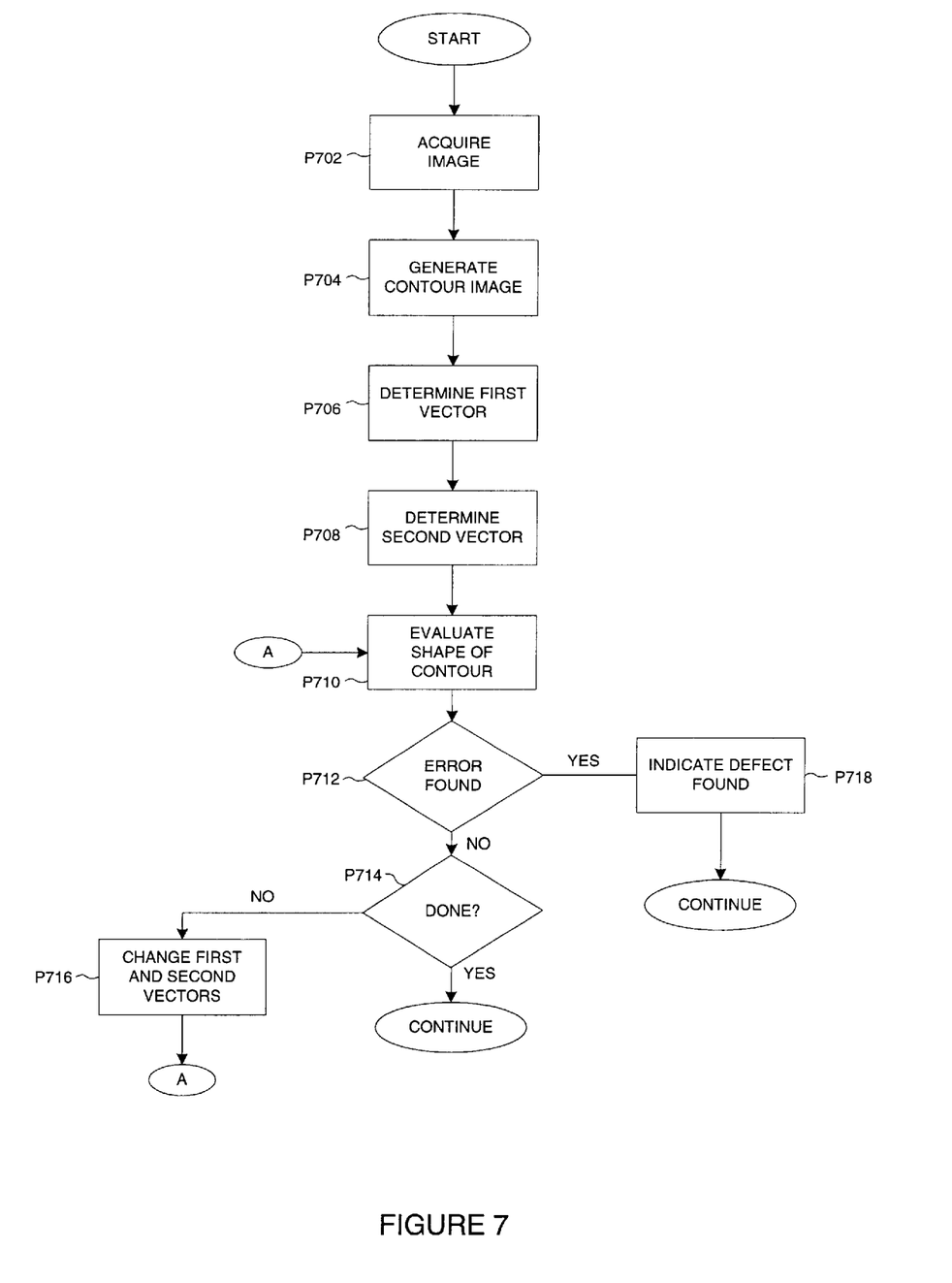
FIGS 7 and 8 show processing in a first embodiment of the invention.

FIG. 7 illustrates the processing which occurs in an embodiment of the invention. At P702 an image is acquired. The image may have previously been acquired and stored in storage 208 or camera 104 may acquire an image of an object, for example, a circuit board 106 to be stored in storage 208 of the vision processing system 102.

At P704, extractor 202 is used to generate a contour image.

At P706, outline traverser 302 uses the first vector determiner 304 to determine vector V1, point V1e and length V1s.

At P708, outline traverser 302 uses the second vector determiner 306 to determine vector V2, point V2e and length V2s.

At P710, evaluator 206 evaluates the shape of the contour. In the illustrated embodiment, a coarse evaluation and a fine evaluation are used.

Figure 8:
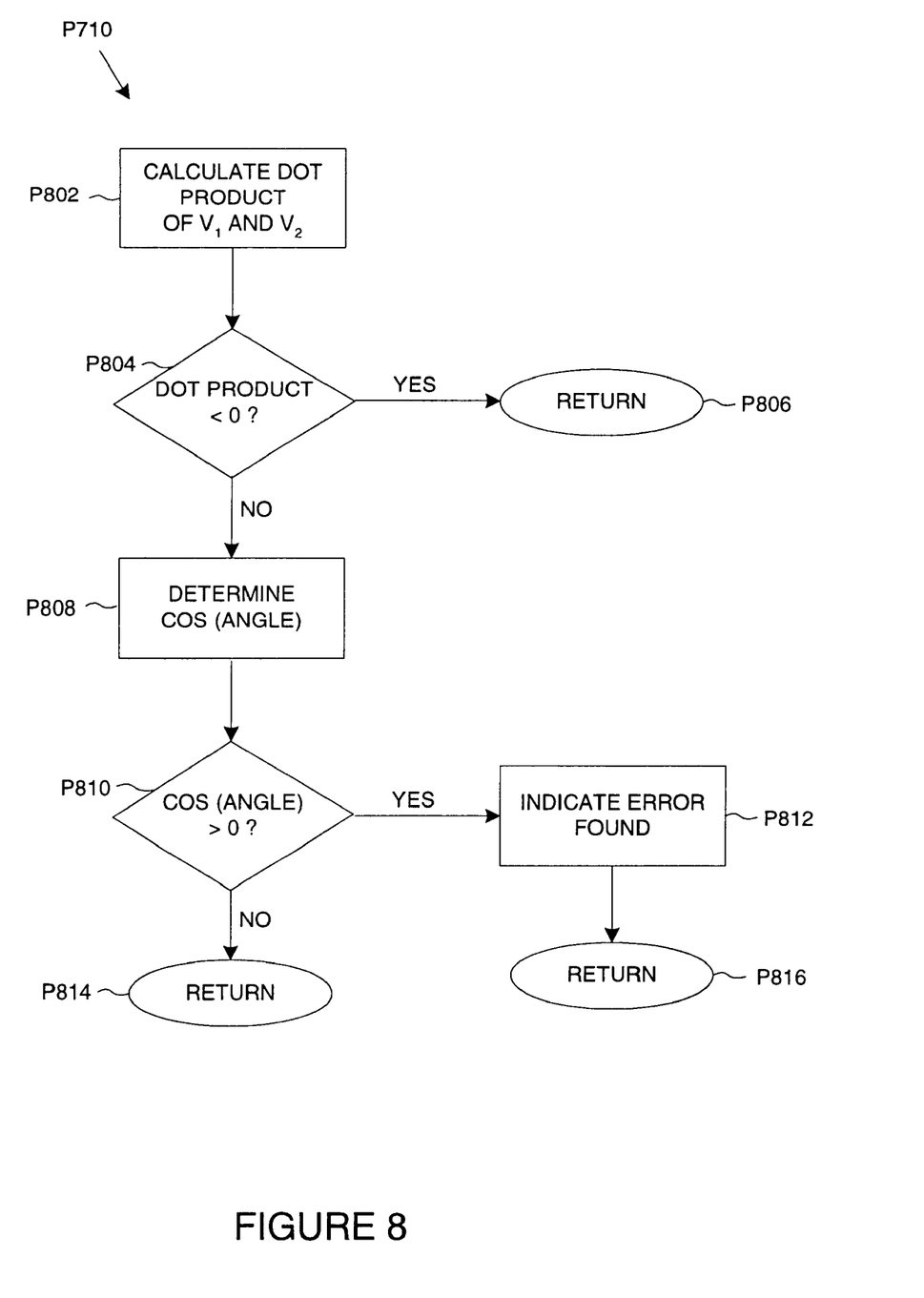

FIG. 8 explains the processing which occurs during act P710. At P802 the dot product of vectors V1 and V2 is calculated. The dot product of V1 and V2 is equal to the length of V1 multiplied by the length of V2 multiplied by the cosine of the angle formed by V1 and V2, as follows:

$$V1 \cdot V2 = |V1||V2| \cos(\text{angle}) \quad \text{(equation 1)}$$

Figure 9:
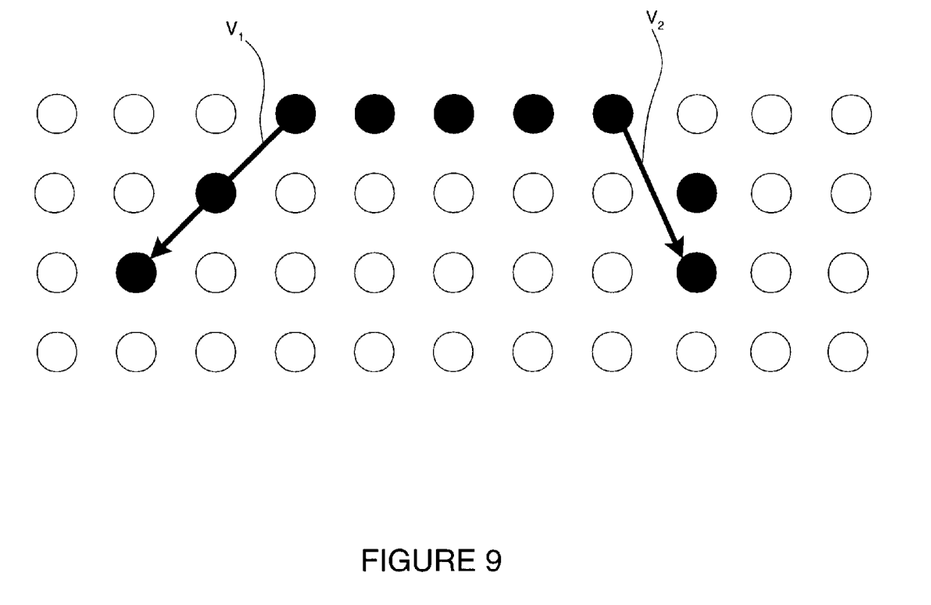
FIG. 9 shows an example of vectors used to explain how to derive a dot product.

FIG. 9 illustrates how this may be determined without determining the length of vectors V1 and V2. FIG. 9 shows the pixel positions of the contour image. Assuming an x, y coordinate system and the origin of V1 is at coordinates (3,3), one can see that the end of the vector V1 is at (1,1). Therefore, the Vector V1 can be described as the difference in the x position of the end point subtracted from the x position of the starting point and the difference in the y position of the end point subtracted from the y position of the starting point. Thus, if the starting point of V1 is at (3,3), the end point of V1 would be at (1,1). Then Vector V1 can be expressed as (1-3, 1-3) or (−2, −2). Similarly if the end point of V2 is at (8, 1) and the start point is at (7, 3), vector V2 could be expressed as (8-7, 1-3) or (1, −2). The dot product can then be calculated by multiplying the numerical values of first coordinate positions of V1 and V2 and adding the product of the numerical values of the second coordinate positions of V1 and V2. For the above example this would be (−2)(1)+(−2)(−2), which equals −2+4 or 2.

In the above example, the dot product of V1 and V2 is not less than 0. Thus, since the cosine of the angle formed by V1 and V2 can be expressed as;

$\cos(\text{angle}) = V1 \cdot V2/(|V1||V2|)$ (equation 2), derived from equation (1) above, and since $V1 \cdot V2$ is a positive number, in this example, and the lengths of V1 and V2 will always be positive, we know that cos(angle) is positive. Therefore, we know that the angle formed by V1 and V2 is somewhere between 0 and 90 degrees.

In act P802, the dot product of the vectors may be calculated as shown above and at P802 a determination is made as to whether the dot product is less than 0. If, the dot product is <0, then the angle formed by the vectors V1 and V2 is greater than 90 degrees and less than 270 degrees, indicating that the circuit is not defective.

Acts P802 through P804 can be referred to as a coarse evaluation.

If the coarse evaluation method, at P804, determines that the dot product is not <0, as in our example above, then the angle formed by vectors V1 and V2 is between 0 and 90 degrees and may be defective.

Acts P808 through P810 show a fine evaluation method. At P808, the cosine of the angle formed by V1 and V2 is determined. Applying equation 2 to the above example of FIG. 9, we derive $\cos(\text{angle}) = V1 \cdot V2/(|V1||V2|) = 2/((\sqrt{((-2)^2+(-2)^2)})(\sqrt{(1^2+(-2)^2)})))$, which is equal to $2/(\sqrt{8}\sqrt{5})$, where sqrt indicates square root.

At P810, the derived cos(angle) is compared to a threshold θ, which is predetermined and may be adjusted. If cos(angle) is greater than θ, then P812 will indicate that the circuit is defective.

When P712 is performed, if an error was indicated by P808, then a defect is indicated at P718. The error could be indicated in a number of ways including, but not limited to displaying an error message on a video display or on a print out, or by sounding an alarm tone.

If no error was determined at P712, than at P714 a check is made by the outline traverser 302, as previously discussed, to determine whether the entire outline had been traversed.

If the entire outline had not been traversed, than the outline traverser will change the vectors V1 and V2, as previously described, and control proceeds to P710 to evaluate the shape of the contour defined by new vectors V1 and V2.

If, at P714, it is determined that the entire outline had been traversed, than the evaluation is complete.

Figure 10:
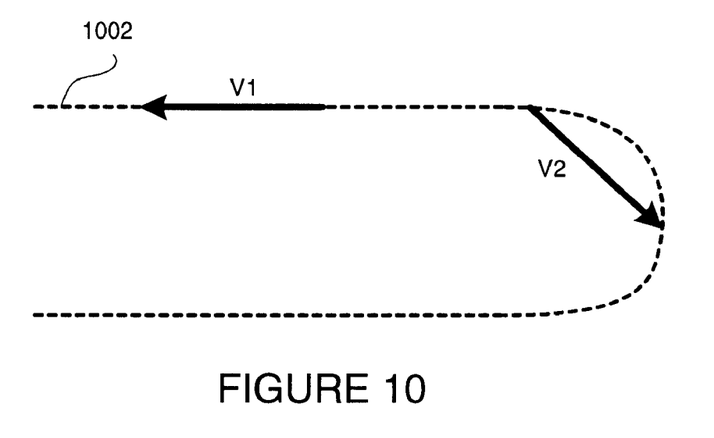
FIGS. 10–12 help to illustrate the evaluation process.

FIGS. 10–12 help to explain the evaluating process. In FIG. 10, one can easily see that the angle formed by vectors V1 and V2 is greater than 90° and less than 180°. Therefore, the cosine of the angle is a value less than zero and the dot product of the vectors is a negative value. In this situation, the coarse evaluation, at P802 to P804, will determine that no defect exists.

Figure 11:
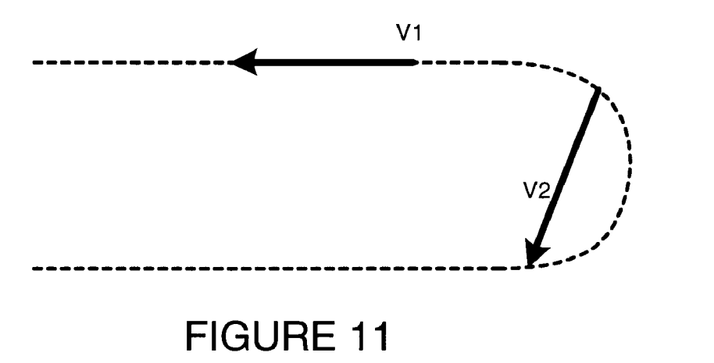

When evaluating the vectors shown in FIG. 11, because the angle formed by vectors V1 and V2 is less than 90°, the cosine of the angle is greater than zero and the dot product of the vectors is not negative. The coarse evaluation, at P802 to P804, would suggest that this is a defect. The fine evaluation, at P808 to P810 will determine the cosine of the angle formed by vectors V1 and V2 and compare that value to theta. The pattern will be flagged as defective if the cosine of the angle is greater than theta.

Figure 12:
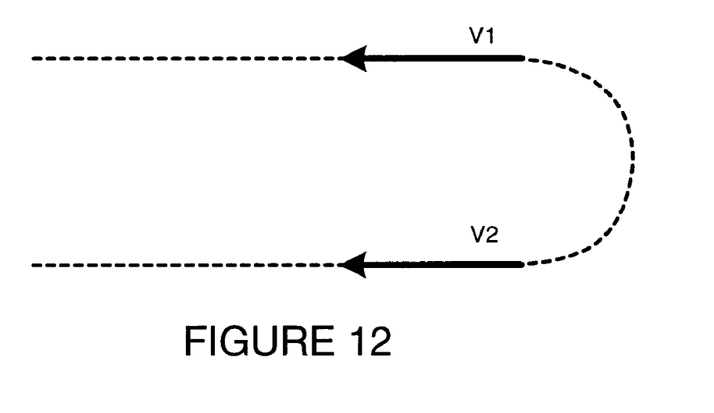

Looking at FIG. 12, one can easily see that the angle formed by vectors V1 and V2 is zero. Therefore, the cosine of the angle is not less than zero. One can easily see that the coarse evaluation at P802 to P804 would suggest that the pattern is defective because the dot product of the vectors is not less than 0, and the fine evaluation, which determines the value of the cos(angle), will flag this pattern as defective if the value of theta is set properly.

The invention may be implemented by hardware or a combination of hardware and software. The software may be recorded on a medium for reading into a computer memory and executing. The medium may be, but is not limited to, for example, a floppy disk, a CD ROM, a Writable CD, a Read-Only Memory (ROM), and a electrically alterable programmable read only memory (EAPROM).

While the invention has been described with reference to the certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not limited to the particulars disclosed, but rather extends to all equivalent structures, acts, and materials, such as are within the scope of the appended claims.

I claim as my invention:

1. A method comprising:

acquiring an image of a circuit pattern;

extracting an outline of the circuit pattern to generate a contour image, the contour image including a plurality of pixels;

determining a first vector extending from a first pixel to a second pixel of the contour image;

determining a second vector extending from a third pixel to a fourth pixel of the contour image, an origin of the first vector and an origin of the second vector being separated by a predetermined distance; and evaluating a shape of a contour in the contour image based on the first vector and the second vector to determine whether a defect exists.

2. The method of claim 1, further comprising:

changing one of the first vector and the second vector to extend from an endpoint of another of the first vector and the second vector to a new pixel;

changing the another of the first vector and the second vector to extend from a pixel being the predetermined distance from an origin of the changed one of the first vector and the second vector to another new pixel;

repeating the acts of evaluating of the shape of the contour, changing of the one of the first vector and the second vector and changing of the another one of the first vector and the second vector until one of evaluating determines that the defect exists and the contour has been completely traversed by the vectors.

3. The method of claim 2, wherein evaluating comprises:

determining an angle formed by the first vector and the second vector; and determining whether a defect exists based on the angle.

4. The method of claim 3, wherein determining determines whether the defect exists based on a sign of the cosine of the angle.

5. The method of claim 2, wherein extracting comprises:

determining a dot product of the first vector with the second vector; and determining that the defect exists when the dot product is a value greater than zero and a cosine of an angle formed by the first and the second vectors is less than a predetermined threshold.

6. An apparatus comprising:

a storage device to store an acquired image, the acquired image including an image of a circuit pattern;

an outline extractor to extract an outline of the circuit pattern in the image;

an evaluator comprising a vectorizer, the vectorizer including:

a first vector determiner to determine a first vector, the first vector extending between a first pixel and a second pixel of the image, and a second vector determiner to determine a second vector, the second vector extending between a third pixel and a fourth pixel of the image, an origin of the first vector and an origin of the second vector being separated by a predetermined distance, wherein the evaluator evaluates a shape of the outline of the circuit pattern, based on the first vector and the second vector to determine whether a defect exists.

7. The apparatus of claim 6, further comprising:

an outline traverser to cause the one of the first vector determiner and the second vector determiner to change an associated one of the first vector and the second vector to extend from an endpoint of another of the first vector and the second vector to a new pixel and to cause the another of the first and the second vector determiner to change the associated vector to extend from another new pixel, being a predetermined distance from an origin of the changed one of the first vector and the second vector, to another pixel of the image, the outline traverser being configured to determine when an entire periphery of the outline has been traversed, wherein:

the evaluator is arranged to evaluate the shape of the outline of the circuit pattern based on each of the changed first vector and the changed second vector until one of a defect is determined and the outline traverser has caused the first and the second vectors to traverse an entire periphery of the outline.

8. The apparatus of claim 7, wherein the extractor is arranged to determine an angle formed by the first vector and the second vector, and the extractor determines that the defect exists based on the angle.

9. The apparatus of claim 8, wherein the extractor determines that the defect exists based on a sign of a cosine of the angle.

10. The apparatus of claim 7, wherein the extractor is arranged to determine a dot product of the first vector with the second vector and to determine that a defect exists when the dot product is a value greater than zero and a cosine of an angle formed by the first and the second vectors is greater than a predetermined threshold.

11. A machine-readable medium having recorded therein information, such that when the information is read and executed by a processor, the processor is caused to:

extract an outline of a circuit pattern from an acquired image to generate a contour image, the contour image including a plurality of pixels;

determine a first vector extending from a first pixel to a second pixel of the contour image;

determine a second vector extending from a third pixel to a fourth pixel of the contour image, an origin of the first vector and an origin of the second vector being separated by a predetermined distance; and evaluate a shape of a contour in the contour image based on the first vector and the second vector to determine whether a defect exists.

12. The medium of claim 11, wherein the processor is further caused to:

change one of the first vector and the second vector to extend for an endpoint of another of the first vector and the second vector to a new pixel;

change another of the first vector and the second vector to extend from a pixel being the predetermined distance from an origin of the changed first vector to another new pixel;

repeat evaluating the shape of the contour, changing of the one of the first vector and the second vector and changing of another of the first vector and the second vector until one of the evaluating determines that the defect exists and the contour has been completely traversed by the vectors.

13. The medium of claim 12, wherein when the processor evaluates the shape of the contour, the processor:

determines an angle formed by the first vector and the second vector; and determines whether a defect exists based on the angle.

14. The medium of claim 13, wherein when the processor determines whether a defect exists based on the angle, the processor is caused to determine a cosine of the angle, and the processor determines that a defect exists based on a sign of the cosine of the angle.

15. The medium of claim 12, wherein when the processor evaluates the shape of the contour, the processor is caused to:

determine a dot product of the first vector with the second vector; and determine that the defect exists when the dot product is a value greater than zero and a cosine of an angle formed by the first and the second vectors is greater than a predetermined threshold.

* * * * *